July 22, 1941.  J. M. WILSON  2,250,120

AUTOMATIC CONTROL SYSTEM FOR FUEL BURNERS

Filed Jan. 28, 1939

Inventor
John M. Wilson
George H. Fisher
Attorney

Patented July 22, 1941

2,250,120

UNITED STATES PATENT OFFICE 2,250,120

AUTOMATIC CONTROL SYSTEM FOR FUEL BURNERS

John M. Wilson, Minneapolis, Minn., assignor to Minneapolis-Honeywell Regulator Company, Minneapolis, Minn., a corporation of Delaware Application January 28, 1939, Serial No. 253,338

4 Claims. (Cl. 158—28)

It is a general object of this invention to provide a relatively simple control system for fuel burners in which no electromagnetic relays are used, and yet which has various features which render the system safe under conditions of power failure, ignition failure, and flame failure.

In the system embodying this invention, a combustion responsive switch is used to place them in running condition if combustion is established before the timing period for the safety switch has elapsed. It is a further object of the invention to provide a means for preventing the system from making a start from its cold condition if the combustion switch should be stuck closed, said means comprising a contact engaged by the timer when it is in its cold position.

The systems all include a burner motor, a timer for controlling the motor, a heater for the timer, a space thermostat for controlling the heater, and a safety switch for controlling the delivery of electrical energy to all of the above devices, as well as the usual combustion responsive switch. One of the objects of the invention is to provide a system of this type in which the burner motor circuit and the circuit to the timer heater are both line voltage, but the space thermostat does not carry the current for the burner motor. This arrangement is especially adapted for use where an auxiliary heater for the space thermostat is desired because the size of the heater to be used will not depend upon the type and rating of the burner motor controlled by the system.

A still further object is to provide a circuit of the type described above, in combination with a step-down transformer. In this case the burner motor circuit is connected across the line, the primary of the transformer is connected across the line and the safety switch is connected in series with both circuits. The thermostat and heater are in the secondary circuit, opening of the safety switch cutting off the power to all three circuits. Here again, the circuit is especially adapted for use with a space thermostat having an auxiliary heater as the motor current does not pass through the heater or thermostat.

Figure 1:
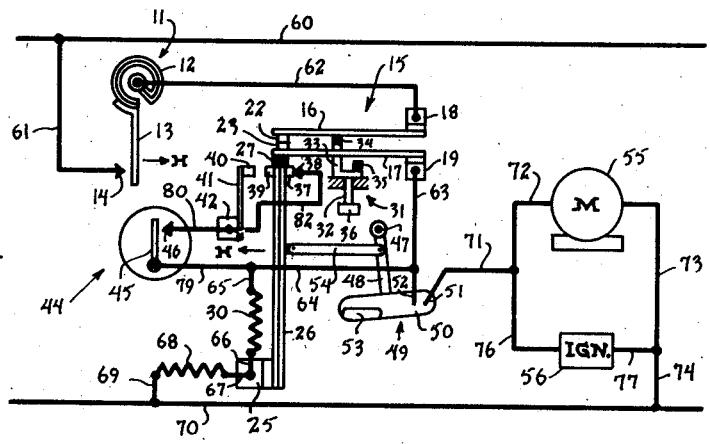
Figure 2:
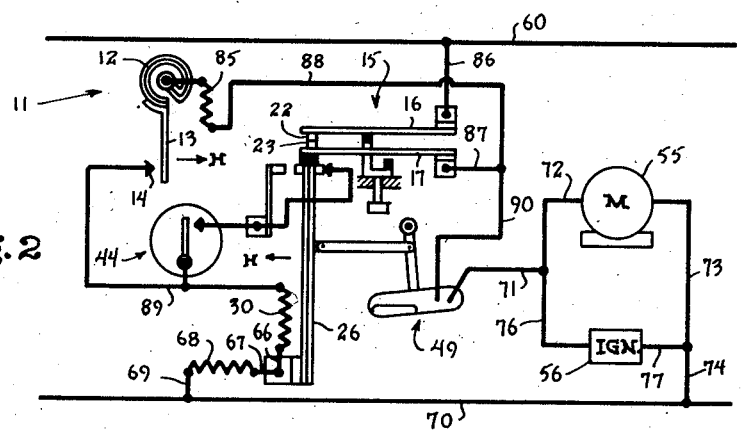
Figure 3:
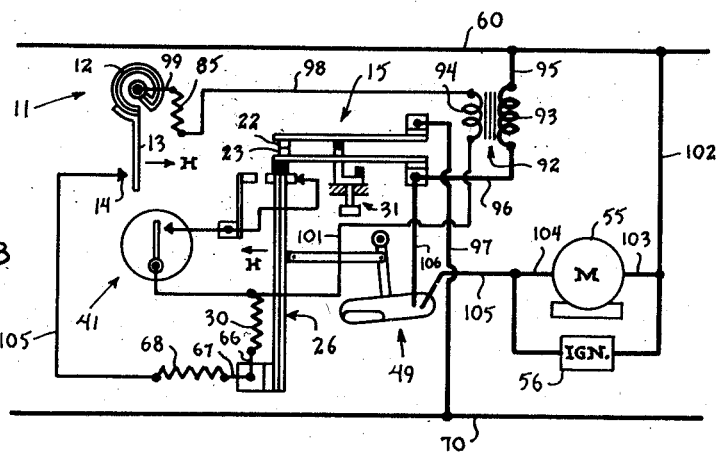

These and other objects will become readily apparent as the following specification is read in the light of the accompanying drawing in which:

Figure 1 is a diagrammatic showing of one of my circuits in which the burner motor circuit and the timer heater circuits are both line voltage and the space thermostat carries the motor current, Figure 2 is a diagrammatic showing of a circuit similar to that shown in Figure 1 except that here the space thermostat does not carry the motor current, and Figure 3 is a diagrammatic showing of a circuit showing the use of a step-down transformer for providing a low voltage circuit for the space thermostat.

The three circuits disclosed in the present application are of the same general type as those disclosed in applicant's copending application, Serial No. 253,337, filed on January 28, 1939, and the copending application of William J. McGoldrick Serial No. 253,309, filed on January 28, 1939.

Referring now to Figure 1 of the drawing, the space thermostat has been generally indicated by reference numeral 11. It is to be understood however that a boiler thermostat or pressure responsive device or any other type of control instrument may be substituted for the space thermostat. This thermostat comprises a bimetal coil 12 which carries at its free end a contact arm 13, which on a decrease in temperature to a predetermined point is adapted to engage the stationary contact 14. The safety switch which is generally indicated at 15 comprises a pair of resilient blades 16 and 17 which are mounted respectively on the brackets 18 and 19. Blade 16 carries contact 22 and blade 17 carries contact 23, these contacts being in engagement under certain circumstances which will be set forth hereinafter. Mounted upon bracket 25 is a bimetallic blade 26 which carries an insulating button 27 at its upper end. The resilient blade 17 is biased in a downward direction and when the bimetal blade 26 is in its cold position as disclosed in Figure 1, the button 27 will hold the blade 17 in its raised position at which time the contacts 22 and 23 will be in engagement.

Closely associated with the bimetal blade 26 is an electric heating element 30 and under the influence of the heat produced by the element 30 the bimetal blade 26 will flex to the left until the button 27 moves beyond the free end of the blade 17, at which time blade 17 will be permitted to move downwardly by means of its bias. A manual reset member generally indicated at 31 comprises a stem 32 and a U-shaped portion 33 having a long leg which carries an insulating tip 34 and a short leg which carries an insulating tip 35. After the bimetal blade 26 has flexed to move its button 27 beyond the end of the blade 17, the blade 17 will move downwardly until it engages the insulating tip 35 of the reset member 31. The tip 34 on the same reset member will prevent the blade 16 from following blade 17 and the contacts 22 and 23 will therefore be separated.

As bimetal element 26 cools, it is unable to flex toward the right due to the fact that the button 27 is abutting the end of blade 17 which prevents such movement. In order to return the parts to the position shown in Figure 1 in which the switch contacts 22 and 23 are closed, it is necessary to perform a manual operation. This is accomplished by pushing against the button 36 of the reset member 31 which first raises the blade 16 out of the path of movement of blade 17 and then raises the blade 17 until it releases the button 27 permitting the bimetallic blade 26 to return to its cold position shown in Figure 1. It will be noted at this time that the contacts 22 and 23 are being held in open position and they will not be reclosed until the button 36 is released, at which time the blade 17 will be held in raised position by its engagement with the button 27 and the blade 16 will then move downwardly until its contact 22 engages the contact 23.

The free end of the bimetallic blade 26 carries a contact 37 which engages a stationary contact 38 when the bimetal element is in its cold position. A second contact 39 is mounted on the other side of the free end of the bimetallic element which is adapted to cooperate with the contact 40 carried by the resilient blade 41 which in turn is mounted on the bracket 42. Contact 40 is so positioned that it will be engaged by the contact 39 as the bimetallic element 26 flexes towards the left and before it has flexed far enough to move the button 27 beyond the end of the blade 17.

Indicated generally at 44 is a combustion responsive switch which comprises a movable contact arm 45 and a stationary contact 46. This switch is of the usual slip friction type which is actuated by means of a thermal element responsive to the stack temperature or the temperature in the combustion chamber of the furnace. Due to the slip friction action between the thermal element and the switch arm, the switch is responsive to a change in temperature rather than to any predetermined temperature.

Pivoted at 47 is an arm 48 which carries a mercury switch generally indicated at 49. This switch comprises a glass tube 50 having electrodes 51 and 52 in one end thereof and a body of mercury 53 which is adapted to roll along the bottom of the tube and make and break the circuit across the electrodes as the tube is tipped back and forth. A link 54 is pivotally connected at one end to the arm 48 and at the other end to the bimetal element 26 so that as the bimetal element flexes back and forth in response to the action of the heater 30, it tips the switch 49 back and forth by means of the link 54. The usual burner motor 55 and ignition device 56 are provided for producing combustion within the furnace.

*Operation*

If the room temperature is above the predetermined value for which the thermostat 11 has been set and if this condition has prevailed for a predetermined length of time, the bimetallic element 26 will have moved to its cold position in which the contact 37 and 38 are in engagement and in which the mercury switch 49 is in open position and the combustion responsive switch 44 will have responded to a decrease in temperature in the furnace and the switch arm 45 will be out of engagement with the contact 46. The normally closed safety switch contacts 22 and 23 will be in engagement and the system will be ready to make a normal start. Due to the fact that there is no combustion within the furnace, the room temperature will begin to drop and when it reaches the predetermined point for which the thermostat 11 has been set, the bimetal element 12 will bring the switch arm 13 into engagement with its stationary contact 14. This will establish the following circuit: from line wire 60, conductor 61, contact 14, switch arm 13, bimetallic element 12, conductor 62, bracket 18, contact blade 16, contacts 22 and 23, contact blade 17, bracket 19, conductors 63, 64, 65, heater element 30, conductors 66 and 67, protective resistance 68, and conductor 69 back to the other side of the supply line 70. This circuit will energize the electric heater 30 and cause the bimetallic element 26 to flex toward the left. This movement through the link 54 will rotate the arm 48, tipping the switch 49 and causing the mercury 53 to bridge the electrodes 51 and 52. This will set up the following circuit: from supply line 60 through the thermostat 11 and safety switch, as traced above, conductor 63, electrodes 52 and 51 through the mercury 53, conductors 71 and 72, burner motor 55, and conductors 73 and 74 back to the other side of the supply line 70. Conductors 76 and 77 connect the ignition device 56 in parallel with the burner motor 55 from the conductors 71 and 74 so that the ignition will be on during the entire time that the burner motor is energized.

Energization of the burner motor and the ignition device will normally produce combustion within the furnace and the combustion responsive switch 44 will respond to the increase in temperature and cause the switch arm 45 to engage the stationary contact 46. In the meantime, the bimetallic element 26 will continue to flex toward the left under the influence of the heater 30 and after a predetermined length of time it will bring the contact 39 into engagement with contact 40. If the combustion responsive switch has closed at this time, a shunt circuit will be set up around the heater 30 causing it to be deenergized. This shunt circuit may be traced from conductor 64, conductor 79, switch arm 45, contact 46, conductor 80, resilient blade 41, contacts 40 and 39, and bimetallic element 26 back to the junction of conductors 66 and 67 through the bracket 25 which supports the bimetallic element 26. As this shunt circuit deenergizes the heater 30, the bimetallic element 26 will start to cool and move toward the right. This will break the shunt circuit at the contacts 39 and 40, reenergizing the heater 30 and again causing the bimetallic element 26 to flex towards the left and remake the contacts 39 and 40. This recloses the shunt circuit causing the above cycle to repeat itself. The bimetallic element 26 will continue to oscillate back and forth making and breaking the contacts 39 and 40 as long as the room thermostat continues to call for heat and the combustion responsive switch 45, 46 remains closed. During this time, the bimetallic element 26 maintains the mercury switch 49 in closed position so that the burner motor 55 and the ignition device 56 remain energized. This is the normal running condition of the system.

In response to an increase in temperature due to the combustion within the furnace, the room temperature will start to rise and after it reaches a predetermined value the bimetallic element 12 will move the switch arm 13 out of contact with the stationary contact 14. This will cut off the supply of electrical power to the control system and the burner motor and ignition device will be immediately deenergized, extinguishing the fire within the furnace. The bimetallic element 26 will start cooling due to the deenergization of the electric heater 30 and will eventually bring the contact 37 into engagement with contact 38.

Under certain conditions, it might happen that the contacts 45 and 46 of the combustion responsive switch 44 might stick in closed position when the system is shut down. Under these conditions, there would be no check as to whether or not combustion had been established when the system was next started up so that if for some reason ignition failed the burner motor would continue to force raw oil into the combustion chamber. In order to prevent such a thing from happening, a circuit has been arranged so that the heater 30 cannot be energized if the bimetallic element 26 is in its cold position and the contacts 45 and 46 are stuck closed. If the contacts 45 and 46 are stuck closed and the room thermostat calls for heat, the following circuit will be estabished: from the supply line 60 through conductor 61, room thermostat 11, conductor 62, safety switch 15, conductors 63, 64, 79, switch arm 45, contact 46, conductors 80 and 82, stationary contact 38, contact 37, and bimetallic element 26 to the bracket 25, conductor 67, protective resistance 68, and conductor 69 back to the other side of the supply line 70. Thus it will be seen that under these circumstances, a shunt circuit through the combustion responsive switch is set up around the electric heater 30 so that on a demand for heat by the room thermostat the bimetallic element 26 will not be heated and hence will not close the mercury switch 49 to energize the burner motor and ignition means. In order to start the system, it will be necessary to manually open the combustion responsive switch so that it will again be in condition to operate normally.

If the room thermostat calls for heat and the bimetallic element 26 is heated to close the circuit to the burner motor and ignition means and for some reason combustion is not established, the system will go out on safety. This result is obtained because the combustion switch will not close and as the bimetallic element 26 flexes toward the left and brings the contacts 39 and 40 into engagement, the shunt circuit around the heater 30 will not be set up and therefore the bimetallic element will continue to heat and flex toward the left, at which time it will press back the resiliently mounted contact 40 until the insulated button 27 is carried beyond the end of the blade 17 permitting the safety switch contacts 22 and 23 to open as described above. It is clear that opening of the safety switch contacts 22 and 23 cuts off the supply of electric power to the burner motor and ignition device and to the heating element 30 but that the bimetallic element 26 is prevented from flexing toward the right and returning to its cold position due to the engagement of the end of the blade 17 with the button 27. In order to restart the system, the safety switch must be reset manually to closed position in the manner described above.

If the system should be operating normally in its running condition and if flame failure should occur, the combustion responsive switch 45, 46 would open making it impossible to establish the shunt circuit around the electric heater 30. Under these conditions, the bimetallic element 26 would continue to flex to the left and a safety lock-out would occur as in the case of ignition failure.

If a power failure should occur at any time, the bimetallic element 26 would cool and return to its cold position opening the mercury switch 49 so that the system would then be in condition to attempt a normal start when the power came back on.

In the system disclosed in Figure 2, the rooom thermostat 11, safety switch 15, mercury switch 49, combustion responsive switch 44, bimetallic element 26, burner motor 55, and ignition device 56 are the same as those in Figure 1 and therefore will not be described in detail again. It will be noted that in Figure 1 the current for the burner motor and ignition device also passes through the room thermostat. The circuit in Figure 2 has been so designed that the room thermostat only carries the current for the electric heater 30 and the shunt circuit around the heater through the protective resistance 68. This circuit also passes through the safety switch 15. The circuit to the burner motor 55 and ignition device 56 is independent of the room thermostat circuit but it will be noted that the burner motor circuit also passes through the safety switch 15 so that when the system goes out on safety the electric power is cut off to all of the operating devices. A circuit of this type is particularly adapted for use with a room thermostat having an auxiliary heater in series therewith for raising the temperature of the thermostat slightly above room temperature when the burner motor is energized so as to anticipate the return of the room temperature to normal, thereby preventing the system from overshooting. Such an auxiliary heater has been shown at 85.

On a call for heat by the room thermostat, the following circuit is established: supply line 60, conductor 86, contact blades 16 and 17 through contacts 22 and 23, conductors 87 and 88, auxiliary heater 85, bimetallic element 12, switch arm 13, stationary contact 14, conductor 89, electric heater 30, conductors 66 and 67, protective resistance 68, and conductor 69 back to the other side of the supply line 70. In response to the heat generated by the heater 30, the bimetallic element 26 will flex toward the left and close the mercury switch 49 establishing the following circuit: supply line 60, conductor 86, contact blades 16 and 17, conductors 87 and 90, mercury switch 49, conductors 71 and 72, burner motor 55, and conductors 73 and 74 back to the other side of the supply line 70. As in Figure 1, the ignition device 56 is connected in parallel with the burner motor 55 by means of conductors 76 and 77.

It will therefore be seen that the circuit to the thermostat and electric heater 30 is entirely independent of the circuit through the mercury switch 49 and the burner motor and ignition means. The effect of the auxiliary heater on the bimetallic element 12 is obvious and well known and in all other respects the control system disclosed in Figure 2 operates in the same manner as the system of Figure 1, except that on a shut down by the space thermostat 11 the burner will continue to run until the bimetallic element 26 cools sufficiently to open the mercury switch 49. This will occur in a relatively short time. It will be clear from an inspection of Figure 2 that this system will also give the same protection on ignition failure, flame failure, power failure, and will also prevent the system from starting if the bimetallic element 26 is in its cold position and the combustion responsive switch 44 is stuck in closed position. In view of the detailed description of Figure 1, it is thought that the operation of Figure 2 will now be clear without further description.

The system disclosed in Figure 3 is of the same general type and operates on the same principle as the systems disclosed in Figures 1 and 2 except that in Figure 3 a step-down transformer generally indicated at 92 is disclosed and the primary 93 of the transformer is connected between the supply line 60 and the supply line 70 through the safety switch 15 and the circuit to the burner motor 55 and ignition device 56 is also connected across supply lines 60 and 70 through the safety switch 15. The transformer 92 is provided with a secondary winding 94 which provides the source of power for the electric heater 30. It will be apparent that the room thermostat 11, safety switch 15, bimetallic element 26, combustion responsive switch 44, mercury switch 49, burner motor 55, and ignition device 56 in Figure 3 are identical with those in Figures 1 and 2 and that therefore they will not again be described in detail.

As in the other systems, the safety switch contacts 22 and 23 are normally closed so that the primary winding 93 of the step-down transformer 92 is normally energized by a circuit from the supply conductor 60 comprising conductor 95, primary 93, conductor 96, safety switch 15, and conductor 97 back to the other side of the supply line 70. On a call for heat by the room thermostat, the switch arm 13 will be brought into engagement with the stationary contact 14 which will close the following circuit: from one end of the secondary winding 94, conductor 98, auxiliary heater 85, conductor 99, bimetallic element 12, switch arm 13, stationary contact 14, conductor 105, protective resistance 68, conductors 67 and 66, electric heater 30, and conductor 101 back to the other side of the secondary winding 94. This will heat the bimetallic element 26 causing it to flex toward the left in the usual manner and close the mercury switch 49 which will establish the following circuit: supply line 60, conductors 102 and 103, burner motor 55, conductors 104 and 105, mercury switch 49, conductor 106, safety switch 15, and conductor 97 back to the other side of the supply line 70. If combustion is established, the system will attain its running condition in the same manner as in the system disclosed in Figure 1. If for some reason, combustion should not be established the bimetallic element 26 would continue to flex to the left and open the safety switch contacts 22 and 23 as in Figure 1. As the safety switch contacts 22 and 23 are in series relation between the supply line 70 and the primary winding 93 of the step-down transformer 92 and also in series relation with the mercury switch 49 which controls the circuit to the burner motor 55 and the ignition device 56, it will be seen that when the bimetallic element 26 trips the safety switch to open position that the electric power to the entire system will be cut off the same as in the systems of Figures 1 and 2. In order to condition the system for further operation, the safety switch must be manually reset by the member 31 as in the other systems. As in the system disclosed in Figure 2, the burner will continue to run after the space thermostat 11 has been satisfied until the bimetallic element 26 cools sufficiently to tip the mercury switch 49 to open position. It will be clear that this system also will give the same protection against ignition failure, flame failure, power failure, and the sticking of the combustion switch contacts as do the systems of Figures 1 and 2. In view of the detailed description of Figure 1, it is thought that the operation of Figure 3 will now be clear without further detailed description.

This system is also adapted for use with a room thermostat having an auxiliary heater the same as the system of Figure 2 because here again the flow of current through the room thermostat and hence the auxiliary heater is independent of the flow of current through the burner motor and ignition device. Hence the selection of the size of heater 85 need not depend upon the specific type and rating of the burner motor used.

It is to be understood that these specific systems are disclosed for the purposes of illustration and that I intend to be limited only by the scope of the appended claims.

I claim as my invention:

1. In a fuel supply control system, in combination, an electrical fuel controller, a circuit therefor, a fuel controller switch in said circuit, electrical means which when energized closes said fuel controller switch and thereafter renders said fuel controller inoperative, a main switch for energizing said electrical means, circuit connections including a closed hot combustion responsive switch to prevent said fuel controller being rendered inoperative by said electrical means if combustion is established, and means to prevent said fuel controller switch from being moved to closed position while said combustion switch is closed, said means including a circuit shunting at least a portion of said electrical means, said circuit having therein said combustion switch and a switch comprising a stationary contact which is engaged by said electrical means when said fuel controller switch is open and not engaged by said electrical means when said fuel controller switch is closed.

2. In a fuel supply control system comprising in combination, fuel supplying means, means for controlling said fuel supplying means comprising a timer, said timer having a first position in which said fuel supplying means is rendered inoperative, a second position in which said fuel supplying means is rendered inoperative, and an intermediate range between said two positions in which said fuel supplying means is rendered operative, electrical means, a condition responsive device for energizing said electrical means to move said timer from said first position toward said second position, means for preventing said timer from moving into said second position comprising a combustion switch having hot and cold positions, a circuit for preventing the energization of said electrical means by said condition responsive device when said combustion responsive switch is in its hot position, and a switch for comleting said last mentioned circuit comprising a contact engaged by said timer when it is in its cold position.

3. In a fuel supply control system comprising in combination, fuel supplying means, a timer, a first switch operatively connected to said timer for controlling said fuel supplying means, a normally closed safety switch also in control of said fuel supplying means, said timer having a first position in which said first switch is open, said timer having a second position in which it opens said safety switch, said timer also having an intermediate range in which said first switch is closed to maintain said fuel supplying means energized, a condition responsive device for energizing said timer to start it moving from its first position toward its second position, means preventing said timer from assuming its second position including a closed-when-hot combustion switch, and means preventing said condition responsive device from energizing said timer when said combustion switch is in its hot position comprising a contact engaged by said timer when it is in its first position.

4. In a fuel supply control system comprising in combination, fuel supplying means, a circuit therefor, a first switch and a normally open safety switch in control of said circuit, a thermal timer operatively connected to said first switch, a heater for said timer, a circuit for said heater, a condition responsive device in control of said heater circuit, said thermal timer having a cold position in which said first switch keeps said fuel supplying means deenergized, an intermediate range in which said first switch keeps said fuel supplying means energized, and a hot position in which said timer trips said safety switch to open position, a shunt circuit for said heater including a closed-when-hot combustion switch, a second switch completing said shunt circuit closed by said timer when it is in its intermediate range whereby said heater is alternately energized and deenergized as said timer alternately opens and closes said second switch, and a second shunt circuit for said heater including said closed-when-hot combustion switch, said thermal timer, and a contact which is engaged by said timer when said timer is in its cold position whereby said heater cannot be energized when said combustion switch is closed and said thermal timer is in its cold position.

JOHN M. WILSON.